United States Patent Office.

EDWARD DE LA GRANJA, OF BOSTON, MASSACHUSETTS, ASSIGNOR TO HIMSELF AND HERMAN SUSMANN, OF THE SAME PLACE.

*Letters Patent No. 67,170, dated July 30, 1867.*

IMPROVEMENT IN EMBALMING AND PRESERVING DEAD BODIES.

*The Schedule referred to in these Letters Patent and making part of the same.*

TO ALL WHOM IT MAY CONCERN:

Be it known that I, EDWARD DE LA GRANJA, of Boston, in the county of Suffolk, and State of Massachusetts, have invented a new and useful Improvement in Embalming and Preserving Dead Bodies; and I do hereby declare the following to be a full, clear, and exact description of the same, sufficient to enable others skilled in the art to which my invention appertains to make use of it.

This invention consists in the use of a novel preparation to be injected into veins and cavities of the body, for the purpose of preserving it from decomposition.

I inject into the body, through the aorta, a solution of sulphurous acid and the sulphites of soda, potassa, and lime, in water or alcohol. Having thus filled the veins and arteries, I next proceed to fill the cavities of the head, chest, and abdomen, with a preparation made of tannin, gun-cotton, camphor, and resin, dissolved in absolute alcohol or ether, or both, according to circumstances, and stiffened to any desired degree with common cotton and wax.

The elementary proportions of the composition for injecting into the aorta, are, sulphurous acid, one to two ounces; sulphite of lime, four to eight ounces; sulphite of potassa, four to eight ounces; sulphite of soda, eight ounces to one pound; water or alcohol, one gallon; perfume, *ad libitum*. The preparation for filling the great cavities of the body is made by digesting pure tannin in absolute alcohol for fifteen or twenty days, adding at the end of that time absolute ether, until the compound becomes fluid, and dissolving in this fluid as much gun-cotton as it will dissolve without becoming solid. To the liquid resulting from this combination are to be added equal proportions of sulphite of soda, rosin, and camphor, until the whole becomes semi-solid. Perfumes may be added at pleasure. The cavities of the body are to be filled with common cotton thoroughly saturated with this composition. The exact proportions by weight and measure of the ingredients used in this preparation cannot be given, because they entirely depend on the quality of the alcohol, tannin, and ether employed.

Having thus described my invention, what I claim as new, and desire to secure by Letters Patent, is—

1. The preparation above described for injection into the veins and arteries, substantially as specified.
2. The preparation above described for filling the cavities of the head, chest, and abdomen, substantially as specified.
3. The process of preserving dead bodies above described.

To the above specification of my improvement I have signed my hand this 20th day of June, 1867.

E. DE LA GRANJA.

Witnesses:
SOLON C. KEMON,
NATHAN K. ELLSWORTH.